US007024529B2

(12) United States Patent
Yamada et al.

(10) Patent No.: US 7,024,529 B2
(45) Date of Patent: Apr. 4, 2006

(54) DATA BACK UP METHOD AND ITS PROGRAMS

(75) Inventors: Kyoko Yamada, Kawasaki (JP);
Motoaki Hirabayashi, Yokohama (JP);
Mitsugu Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 10/367,767

(22) Filed: Feb. 19, 2003

(65) Prior Publication Data

US 2003/0204690 A1 Oct. 30, 2003

(30) Foreign Application Priority Data

Apr. 26, 2002 (JP) ............................. 2002-125447

(51) Int. Cl.
*G06F 12/02* (2006.01)
(52) U.S. Cl. ....................... 711/162; 711/161; 707/204; 707/206
(58) Field of Classification Search ........ 711/111–114, 711/154–155, 161, 162, 159; 709/212–216; 707/205

See application file for complete search history.

(56) References Cited

U.S. PATENT DOCUMENTS

| 4,310,883 | A | * | 1/1982 | Clifton et al. .............. 707/205 |
| 5,652,613 | A | * | 7/1997 | Lazarus et al. ............... 725/50 |
| 6,493,804 | B1 | * | 12/2002 | Soltis et al. ................ 711/152 |
| 6,513,101 | B1 | * | 1/2003 | Fisher et al. ................ 711/159 |
| 6,775,703 | B1 | * | 8/2004 | Burns et al. ................ 709/228 |
| 6,775,792 | B1 | * | 8/2004 | Ulrich et al. .................. 714/6 |
| 6,785,768 | B1 | * | 8/2004 | Peters et al. ................ 711/112 |
| 2003/0204571 | A1 | | 10/2003 | Waltermann |
| 2004/0162940 | A1 | | 8/2004 | Yagisawa et al. |
| 2004/0181641 | A1 | | 9/2004 | Nguyen et al. |
| 2004/0205310 | A1 | | 10/2004 | Yamagami |
| 2004/0215831 | A1 | | 10/2004 | Shoji et al. |

FOREIGN PATENT DOCUMENTS

| JP | 11-24846 | 1/1999 |
| JP | P2000-82008 A | 3/2000 |
| JP | P2002-7304 A | 1/2002 |

* cited by examiner

*Primary Examiner*—Than Nguyen
(74) *Attorney, Agent, or Firm*—Mattingly, Stanger, Malur & Brundidge, P.C.

(57) ABSTRACT

User data backup functions are realized through a computer, which is located on the management service provider corporation side and interfaces between a user side computer environment and a storage service side computer environment to support storage service. This computer selects storage devices which meet the user side conditions from a plurality of entirely or partially empty storage devices owned by the storage service side computer environment. The computer receives user data from the user side computer environment, divides the user data into records of a predetermined size and transmits the records to the storage service side computer environment so that the records are distributed and stored to the selected storage devices.

9 Claims, 9 Drawing Sheets

FIG. 3

123 DATA ALLOCATION TBL

| USER DATA | BACKUP DISK | | | | |
|---|---|---|---|---|---|
| | 1 | 2 | 3 | 4 | 5 |
| USR1-A | SSP1-B1 | SSP1-C1 | SSP2-D1 | SSP3-F1 | SSP3-G1 |
| USR2-B | SSP1-B2 | SSP1-C2 | SSP2-D2 | SSP3-F2 | SSP3-G2 |
| | | | | | |

122 USER CONDITIONS TBL

| USER DATA | CAPACITY | COST | TERM (START-END) | NUMBER OF DISTRIBUTIONS |
|---|---|---|---|---|
| USR1-A | 100GB | 10K¥/100GB | 2002 04- 2003 03 | 5 |
| USR2-B | 500GB | 7K¥/50GB | 2002 01- 2002 12 | 2 |
| | | | | |

124 SSP CONDITIONS TBL

| SSP DISK | CAPACITY | COST | TERM (START-END) | INSTALLATION SITE |
|---|---|---|---|---|
| SSP1-B | 500GB | 10K¥/100GB | 2002 01- 2002 07 | TOKYO |
| SSP1-C | 100GB | 6K¥/50GB | 2002 01- 2002 07 | TOKYO |
| SSP2-D | 50GB | 7K¥/50GB | 2002 01- 2005 07 | OSAKA |
|  |  |  |  |  |

Columns: 601, 602, 603, 604, 605

FIG. 6

125 DISK DIVIDING TBL

| DISK | PARTITION | | | |
|---|---|---|---|---|
| SSP1-B | B1 | B2 | B3 | — |
| SSP1-C | C1 | C2 | — | — |
| SSP2-D | D1 | D2 | D3 | — |
| SSP3-F | F1 | F2 | — | — |
| SSP3-G | G1 | G2 | G3 | — |

Columns: 701, 702

DATA BACK UP METHOD AND ITS PROGRAMS

BACKGROUND OF THE INVENTION

The present invention relates to storage backup techniques, and more particularly, to a technique for backing up storage in a remote place.

Since contents of disk storage may be lost by an unexpected accident, data backup is made in most computer systems. Further, data backup tape and other media are kept in a remote site so that they will not be lost together with the original copies in case of a fire, earthquake or the like. Accordingly, a SAN (storage area network)—used backup method is disclosed in Japanese Patent Laid-open No. 2002-7304. Also in Japanese Patent Laid-open No. 2000-82008, a data sharing-based backup method is disclosed.

Large-scale earthquakes, synchronized attacks by viruses, etc. prove a further growing threat to computer systems and their data, which is making it mandatory to keep two or three copies of each data as well as backing up them in a remote site. Backup is therefore becoming a swelling burden in terms of storage capacity, cost and overhead.

SUMMARY OF THE INVENTION

The present invention has been made in view of such a background as mentioned above and an object of the present invention is to provide a high safe data backup storage device advantageous in terms of cost.

According to one aspect of the present invention, there is provided a user data backup technique by computer means which resides between a user side computer environment and a storage service side computer environment to support storage service, the data backup method comprising the steps of: selecting a storage device which meets the user side conditions froth a plurality of entirely or partially empty storage devices owned by the storage service side computer environment; receiving user data from the user side computer environment; and transmitting the user data to the storage service side computer environment for storage in the selected storage device.

BRIEF DESCRIPTION OF THE DRAWINGS

FIG. 3 shows an example of a data allocation TBL 123;

FIG. 4 shows an example of a user conditions TBL 122;

FIG. 5 shows an example of a SSP conditions TBL 124;

FIG. 6 shows an example of a disk dividing TBL 125;

DETAILED DESCRIPTION OF THE PREFERRED EMBODIMENTS

Preferred embodiments of the present invention will be described in detail with reference to the accompanying drawings below.

Figure 1:
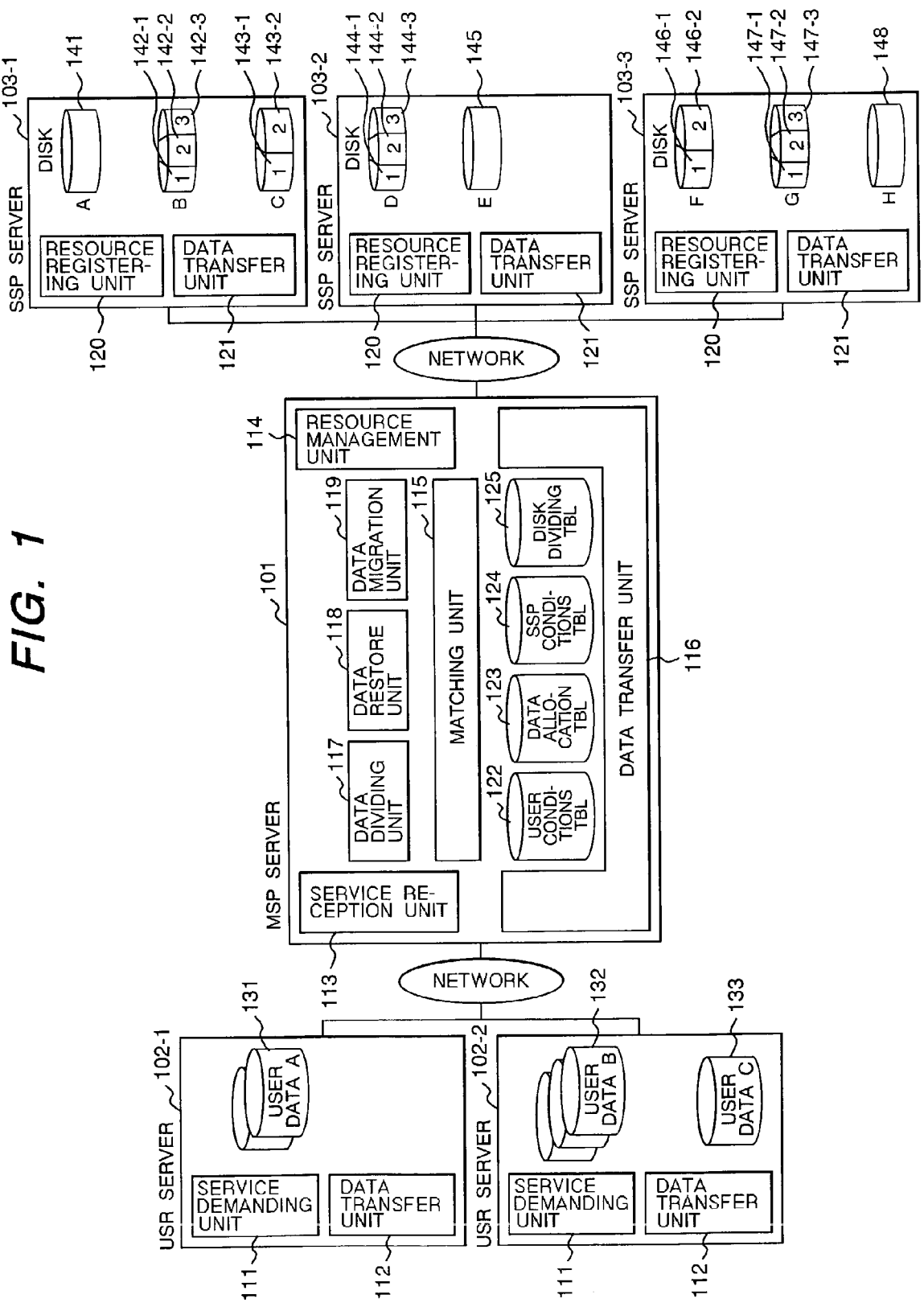
FIG. 1 shows the configuration of a storage service system according to a preferred embodiment of the present invention.

FIG. 1 shows a configuration of a backup storage service system according to an embodiment of the present invention. In the system of FIG. 1, a management service provider corporation (hereinafter denoted as a MSP) provides data backup service to users (hereinafter denoted as USRs) by using idle resources of a plurality of storage service provider corporations (hereinafter denoted as SSPs). Each SSP has a SSP server 103 which is a computer environment on the storage service side. Each USR has a USR server 102 which is a computer environment on the user side. A MSP server 101 is computing means which interfaces between the two computer environments in order to support the storage service.

In FIG. 1, the MSP server 101 receives data from USR servers 102-1 and 102-2, divides the data into records and stores the records in idle resources managed by SSP servers 103-1, 103-2 and 103-3. Here, idle resources mean the currently unused areas of the storage devices such as tape libraries and RAID devices provided for data center business and storage service business. The MSP server 101, the USR servers 102 and the SSP servers 103 are connected via a network such as the Internet.

The MSP server 101 comprises a processing section composed of a service reception unit 113, a resource management unit 114, a matching unit 115, a data transfer unit 116, a data dividing unit 117, a data restore unit 118 and a data migration unit 119. Also there are provided, on its storage device, a user conditions TBL (table) 122, a data allocation TBL 123, a SSP conditions TBL 124 and a disk dividing TBL 125.

The service reception unit 113 is notified by the USR servers 102 of the size of each data to be backed up and the user's preferred conditions (cost, etc.) for using the backup storage service. The service reception unit 113 stores those obtained conditions into the user conditions TBL 122. The resource management unit 114 is notified by the SSP servers 103 of their conditions (empty disk capacity, availability period, etc.) for providing disks. The resource management unit 114 stores those obtained conditions into the SSP conditions TBL 124.

The matching unit 115 searches the user conditions TBL 122 and SSP conditions TBL 124 for mutually conforming combinations. The data transfer unit 116 controls data transfer between the USR servers 102 and the MSP server 101 and between the MSP server 101 and the SSP servers 103.

The data dividing unit 117 divides user data into records whose size is determined depending on the empty disk capacities offered by the SSP servers for backup. The data restore unit 118 refers to the data allocation TBL 123 and reassembles original data from records distributed to a plurality of SSP disks. The data migration unit 119 moves data to an empty area in another SSP server 103 if the availability term of the current backup disk expires or if it becomes necessary during the availability term to return the disk which is currently used as an idle resource. The user is not required to be aware of any data migration executed since the pertinent processing completes within the MSP, which results in a reduced operational cost for the user.

The user conditions TBL 122 stores the user's preferred conditions such as cost and availability term. This table will be described later in detail with reference to FIG. 4. The data allocation TBL 123 stores information about how SSP disks are allocated to user data. In order to raise the safety of data, the data allocation TBL is duplicated. The other copy is held in a separate alternative MSP server. If the MSP server 101 becomes not available due to disaster or failure, the data allocation TBL 123 in the alternative MSP server is accessed. This table will be described later in detail with reference to FIG. 3. The SSP conditions TBL 124 stores disk lending conditions such as empty capacity and cost. This table will be described later in detail with reference to FIG. 5. The disk dividing TBL 125 stores how the lent disks are divided by the MSP into partitions. This table will be described later in detail with reference to FIG. 6.

Each USR server 102 comprises a service demanding unit 111 and a data transfer unit 112. The USR server 102-1 manages user data A (131) while the USR server 102-2 manages user data B (132) and user data C (133).

When a USR server 102 uses the storage service, the USR server 102 issues a backup demanding request to notify the MSP of the required disk capacity, preferred cost, term of use and number of distributions. The number of distributions, which may be specified arbitrarily by the user, is an index determining the number of sites to which the data is apportioned for storage. Generally in a local site, RAID technology is used so that accesses are dispersed to a plurality of storage devices such as hard disks. In the case of the present invention, data is apportioned to a plurality of separate SSP disks connected via a network. How many SSP disks are to be used is determined by the number of distributions, a variable specified by the user. Reliability can be raised by using them like a single disk.

Once some disks are judged appropriate for backup by the MSP server 101, the data is sent to the MSP server 101 from the data transfer unit 112. To restore data from backup disks, the USR server 102 issues a restore demanding request to the MSP server 101 and receives the data from the MSP server 101 via the data transfer unit 112.

Each SSP server 103 comprises a resource registering unit 120 and a data transfer unit 121. The SSP server 103-1 manages disk A (141), disk B (142) and disk C (143). The SSP server 103-2 manages disk D (144) and disk E (145). The SSP server 103-3 manages disk F (146), disk G (147) and disk H (148).

Of the disks managed by a SSP server 103, those disks available for the backup storage service are registered to the MSP server 101 by the resource registering unit 120. The data transfer unit 121 manages data exchange between the USR server and the MSP server.

For example, assume that the backup storage service is to be applied to the user data A (131) in the USR server 102-1 and the user data B (132) in the USR server 102-2. Hereinafter, a disk means a logically independent storage device. Empty disks lent as idle resources are the disk B (142) and disk C (143) under management of the SSP server 103-1, the disk D (144) under management of the SSP server 103-2 and the disk F (146) and disk G (147) under management of the SSP server 103-3. A total of five disks are offered for the backup storage service.

Disk B is divided into partition 1 (142-1), partition 2 (142-2) and partition 3 (142-3); Disk C is divided into partition 1 (143-1) and partition 2 (143-2); Disk D is divided into partition 1 (144-1), partition 2 (144-2) and partition 3 (144-3); Disk F is divided into partition 1 (146-1) and partition 2 (146-2); and Disk G is divided into partition 1 (147-1), partition 2 (147-2) and partition 3 (147-3).

User data A (131), after given the matching processing and then divided into five records in the MSP server 101, is stored to disk B partition 1 (142-1) in the SSP server 103-1, disk C partition 1 (143-1) in the SSP server 103-1, disk D partition 1 (144-1) in the SSP server 103-2, disk F partition 1 (146-1) in the SSP server 103-3 and disk G partition 1 (147-1) in the SSP server 103-3.

Figure 2:
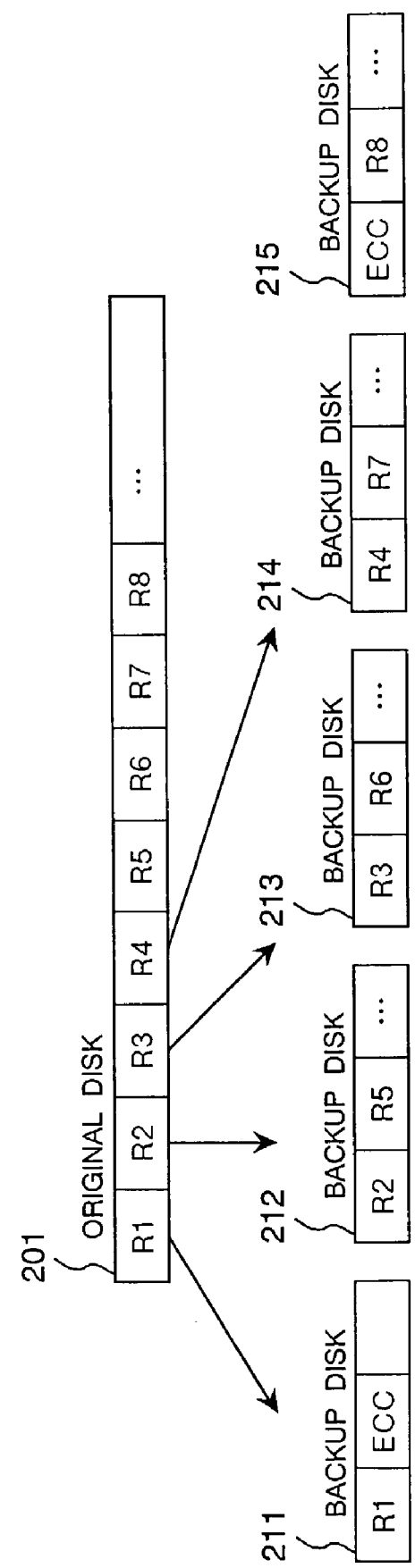
FIG. 2 shows an example of disk dividing and data storage.

FIG. 2 shows how data on a user disk may be divided and stored for backup in the aforementioned embodiment. An original disk 201 is divided into a plurality of records according to the capacities of the backup disks. The original disk 201 corresponds to user data A (131) or user data B (132). The backup disks are represented by disks given numerals 211, 212, 213, 214 and 215 respectively. Each record, labeled with symbol R, may be either a block, a character or a bit. One block is data consisting of characters. The resultant records are sequentially stored on the respective disk partitions in accordance with the number of distributions. In the case of FIG. 2 where the specified number of distributions is assumed to be 5, the records are sequentially stored on the five backup disks 211, 212, 213, 214 and 215. Also note that in this example an ECC or parity record is stored for every four data records (R1, R2, R3 and R4 for instance). If one of some four adjacent records is lost, its corresponding ECC or parity record, code information, can be used to regenerate the lost record. Thus, R1, R2, R3, R4 and their ECC or parity are stored on backup disks 211, 212, 213, 214 and 215, respectively. In this manner, the divided records are sequentially stored on the backup disks. Combining the apportioning of data among a plurality of disks depending on the number of distributions with a parity check or ECC technique, this method is aimed at not only improving access performance but also securing the data.

Since ECC or parity information is stored as a separate record, even if one disk becomes not available due to a failure or the like, it is possible to restore data from records on the other disks. In addition, since each disk is a separate SSP disk, it is not possible to restore the whole data from one disk, which brings about a merit that the security of important data can be protected. Generally, making the size of each record smaller raises security although this requires longer processing time.

FIG. 3 is an example of the data allocation TBL 123 showing how user data is allocated to backup disks. In the data allocation TBL 123, each user data 401 contains a user server name and a disk name, indicating which user data is backed up. Each backup disk 402 contains a SSP server name, disk name and a partition name, indicating which partition is hit by the matching unit 115. In the case of FIG. 3, user data stored on USR1-A is divided into five sets and stored respectively in SSP1-B1, SSP1-C1, SSP2-D1, SSP3-F1 and SSP3-G1. Likewise, user data stored on USR2-B is divided into five sets and stored respectively in SSP1-B2, SSP1-C2, SSP2-D2, SSP3-F2 and SSP3-G2.

FIG. 4 is an example of the user conditions TBL 122 where user-specified conditions for using the backup storage service are stored. In the user conditions TBL 122, each user data 501 contains a user server name and a disk name, indicating which user data is concerned. Each capacity 502 contains the size of the data. Each cost 503 contains a monthly rental fee per unit capacity. Each term (start-end) 504 contains two dates between which the service is to be used or the user data is to be backed up. Each number of distributions 505 contains an index indicating the number of disks to which the user data, including ECC or parity records, is to be apportioned. Specifying a higher value for the number of distributions results in higher safety since the user data will be apportioned among a larger number of disks.

FIG. 5 is an example of the SSP conditions TBL 124 where SSP-specified conditions for providing the backup storage service are stored. In the SSP conditions TBL 124, each SSP disk 601 contains a SSP name and a disk name, identifying a disk registered by the SSP. Each capacity 602 indicates the empty capacity of the disk. Each cost 603 indicates the monthly rental fee per unit capacity charged for the disk. Each term (start-end) 604 contains two dates between which the disk is available. Each installation site 605 contains the name of the site where the disk resides.

FIG. 6 is an example of the disk dividing TBL 125 where how available SSP disks are divided into partitions before lent to users when the storage service is used in the present embodiment. In the disk dividing TBL 125, each disk 701 contains a SSP name and a disk name, identifying a SSP disk registered by the SSP. Each partition 702 contains the name of a partition on the disk. In FIG. 6, disk SSP1-B is divided into three partitions named B1, B2 and B3 respectively. Likewise, SSP1-C is divided into two partitions named C1 and C2 respectively. Information in each partition 702 field corresponds to the logical block number associated with the partition within the disk.

Figure 7:
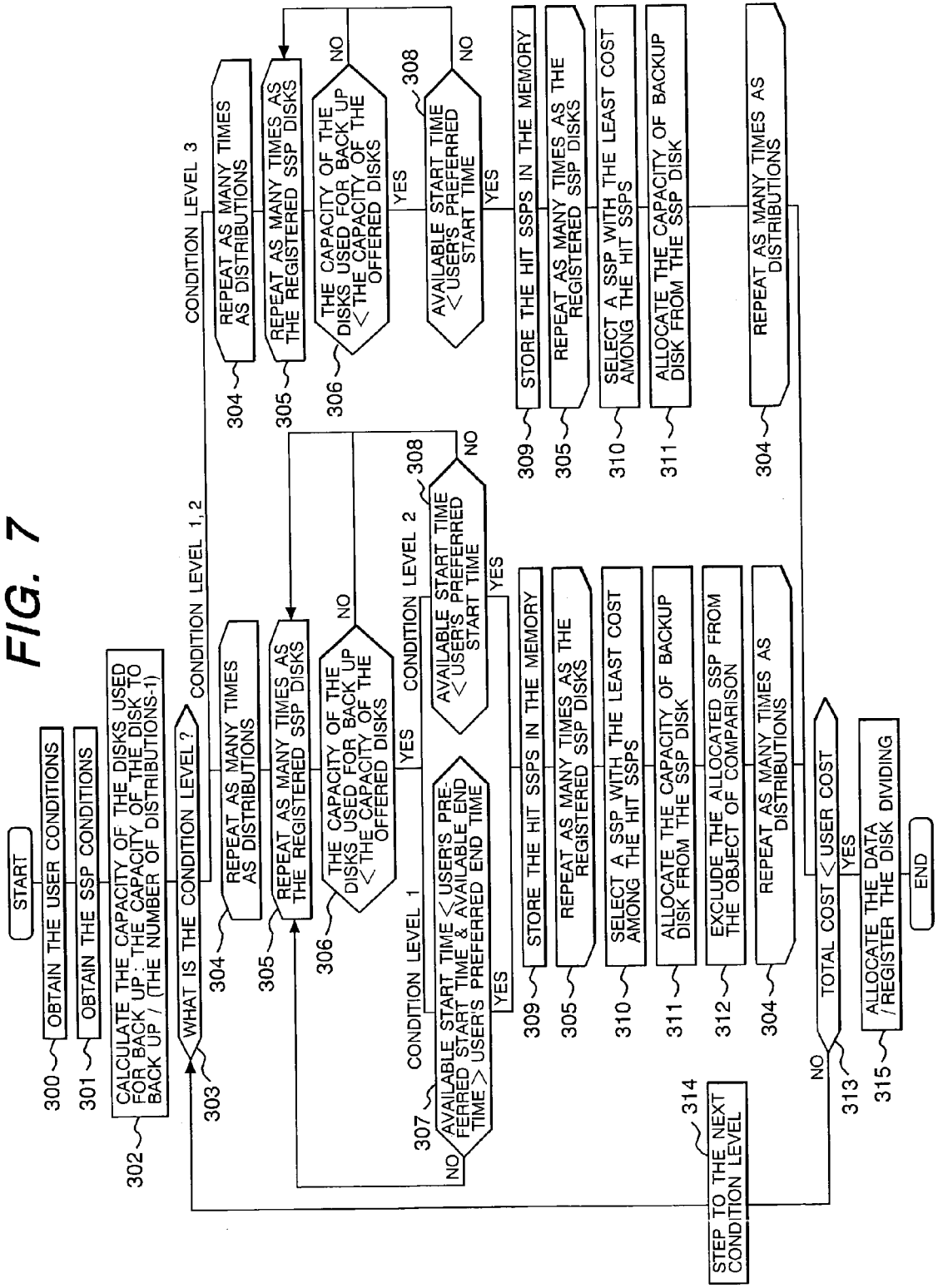
FIG. 7 is a flowchart showing a processing procedure by a matching unit 115 in the preferred embodiment.

FIG. 7 shows a flowchart describing how the matching unit 115 operates to search the user conditions and SSP conditions for mutually conforming combinations. If the operation of the matching unit 115 is started, conditions for using the backup service are obtained from the user conditions TBL 122 (Step 300). Then, SSP conditions for providing the backup service are obtained from the SSP conditions TBL 124 (Step 301). Then, the minimum backup capacity per desk is calculated by dividing the capacity to back up by (the number of distributions—1) (Step 302). The matching unit 115 searches for appropriate SSP disks which meet this minimum backup disk capacity and other conditions. At first, the condition level is set to 1 before condition level judgment is done (Step 303). Search is done at each condition level.

At condition level 1, the minimum backup disk capacity is compared with the capacity 602 of a SSP disk (Step 306) and if the minimum backup disk capacity is smaller, the term (start and end) during which the SSP disk is available is compared with the term (start and end) during which the user wants to back up the data (Step 307). If the term during which the user wants to back up the data is within the term during which the SSP disk is available, the identifier of the SSP disk is stored to the memory (Step 309). This judgment flow is executed for each SSP disk registered (Step 305). Of the hit SSP disks, the lowest cost SSP disk is selected (Step 310) and the minimum backup disk capacity is allocated from the selected SSP disk (Step 311). The hit SSP disk is excluded from the object of comparison in Steps 306 and 307 (Step 312). This loop is repeated as many times as the number of distributions (Step 304) so that as many conforming backup disks as the number of distributions are detected. The total cost for using the backup disks hit. in this manner is calculated and compared with the user cost (Step 313). If the calculated total cost exceeds the user cost, the condition level is incremented by 1 (Step 314) to execute another search flow.

At condition level 2, the date from which the SSP disk is available is compared with the date from which the user wants to back up the data (Step 308). Not like in Step 307, the date until which the SSP disk is available is not compared with the date until which the user wants to back up the data. Then, the total cost for using the backup disks hit in this manner is calculated and compared with the user cost (Step 313). If the calculated total cost exceeds the user cost, the condition level is incremented by 1 (Step 314) to execute another search flow.

At condition level 3, it is not required to distribute the data to different SSP disks and therefore it is allowed to store the data on the same SSP disk. That is, backup disk search is repeated without executing Step 312 where each hit SSP disk is excluded from the object of comparison.

At condition level 3, it is possible that all the user data is allocated to a single SSP disk. Instead of condition level 3, the processing procedure may also be altered in such a manner that 1 is subtracted from the number of distributions specified by the user and then condition level 1 is executed again from Step 302. In this case, the total cost may be reduced to the user cost or below without ignoring the user-desired number of distributions. Note that concentrating the user data to only one SSP disk or SSP server 103 is also an implementation of the present invention although the safety of the user data is sacrificed.

If backup disks are determined as mentioned above, the data allocation and disk dividing are registered (Step 315). That is, the SSP disk partitions allocated according to the minimum backup disk capacity are registered to the disk dividing TBL 125 and data allocation TBL 123. Note that if the matching unit 115 fails to find any SSP disk conforming to the user conditions even at condition level 3, the matching unit 115 terminates its processing after notifying the USR server 102 of the failure.

Figure 8:
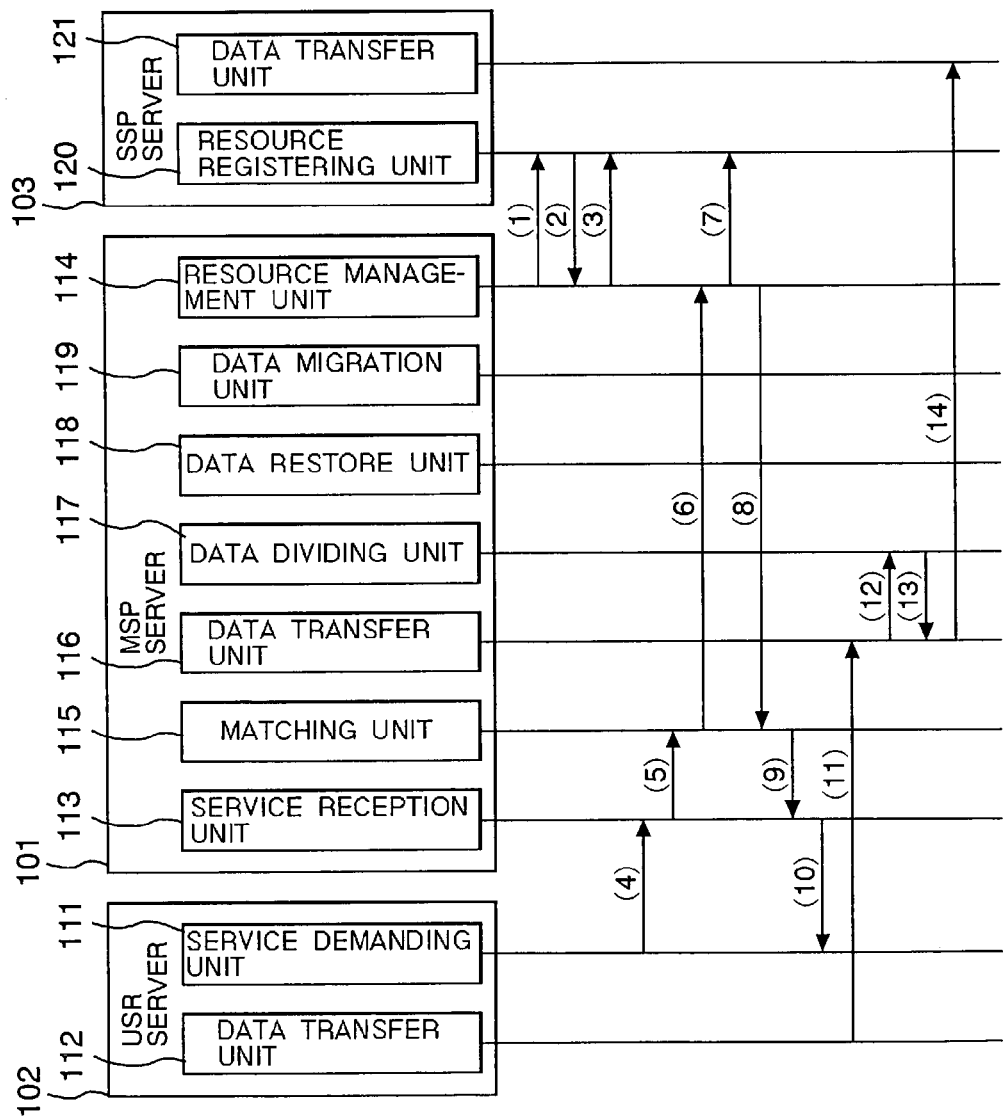
FIG. 8 is a time chart showing a processing procedure for data backup in the preferred embodiment.

FIG. 8 is a time chart indicating how exchanges are done when data is backed up in the embodiment. The resource management unit 114 in the MSP server 101 requests SSP conditions from the resource registering unit 120 in the SSP server 103 (1). When an empty disk is registered in the SSP server 103, the resource management unit 120 registers the conditions to the resource management unit 114 (2). To make the empty disk available, the resource management unit 114 requests the resource registering unit 120 to reserve the empty disk for backup (3).

For the USR server 102 to use the backup storage service, the service demanding unit 111 issues a service demanding request to the service reception unit 113 and notifies the unit of user-desired conditions (4). Upon receiving the request, the service reception unit 113 issues a matching processing request to the matching unit 115 (5). The matching unit 115 searches the user conditions and SSP conditions for mutually conforming combinations. After the search, the matching unit 115 notifies the resource management unit 114 of the matching result (6). The resource management unit 114 refers to the data allocation TBL 123 and disk dividing TBL 125 and issues a rental request to the resource registering unit 120 in a backup SSP 103 (7). The rental request includes the specification of which disk partition is to be used for backup. After a rental request is issued to each backup SSP server 103, the resource management unit 114 notifies the matching unit 115 of the completion (8). Then, the matching unit 115 issues a rental settlement notice to the service reception unit 113 (9). Finally, the service reception unit 113 issues a rental settlement notice to the service demanding unit 111 (10).

Upon receiving the rental settlement notice, the USR server 102 transmits the original data from the data transfer unit 112 to the data transfer unit 116 in the MSP server 101 (11). The transfer unit 116 passes the data to the data dividing unit 117 (12). According to the data allocation TBL 123, the data dividing unit 117 divides the data into records for distribution to the backup SSP servers 103 and transmits the records to the data transfer unit 116 (13). The data transfer unit 116 transfers the records to the data transfer unit 121 of each backup SSP server 103 (14).

Figure 9:
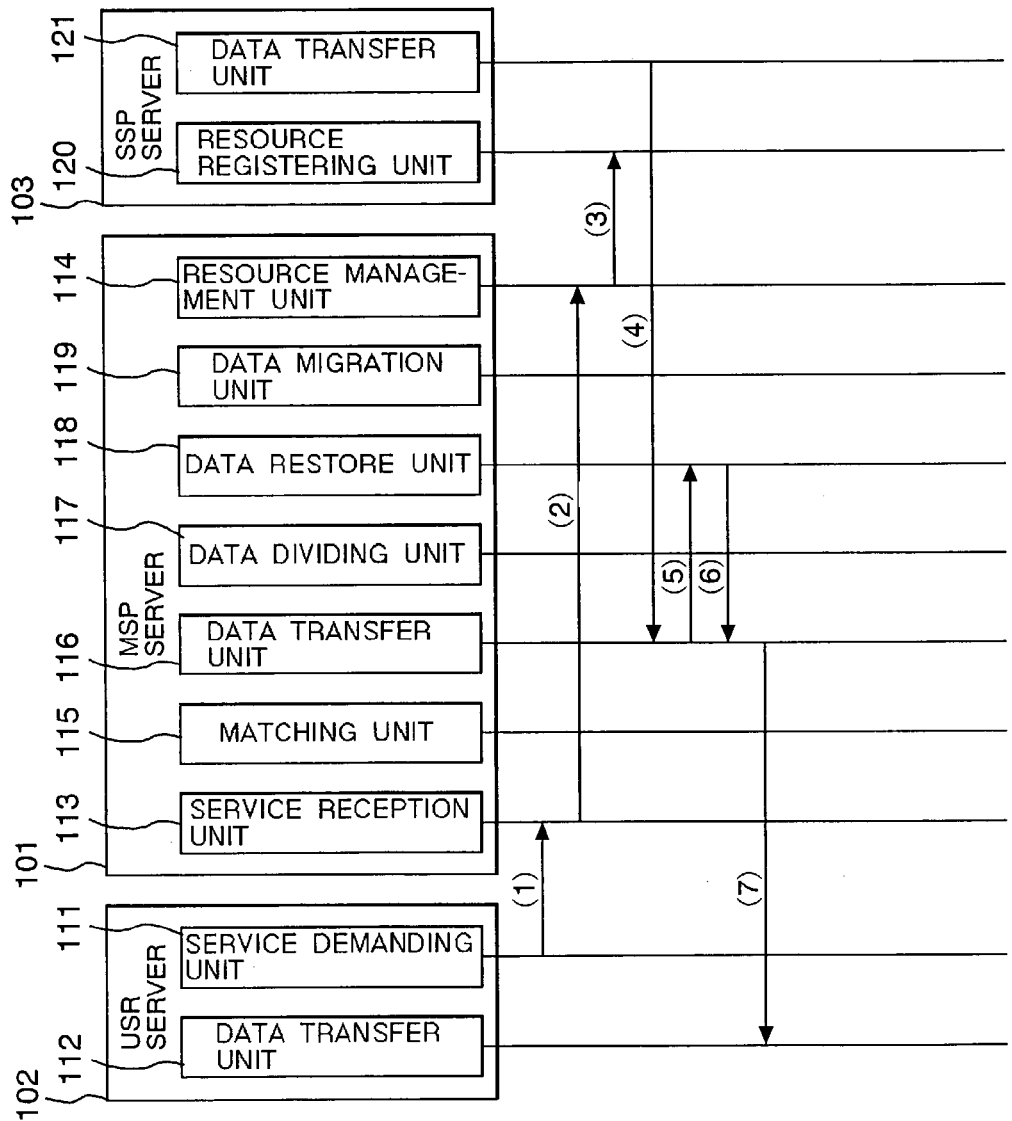
FIG. 9 is a time chart showing a processing procedure for data restoration in the preferred embodiment.

FIG. 9 is a time chart indicating how exchanges are done when data is restored in the embodiment. For a USR server 102 to restore data by using the backup storage service, the service demanding unit 111 issues a service demanding request to the service reception unit 113 and specifies which user data 401 is to be restored (1). Upon receiving the service demanding request, the service reception unit 113 requests the resource management unit 114 to restore the data (2). According to the data allocation TBL 123 and disk dividing TBL 125, the resource management unit 114 requests the resource registering unit 120 in each backup SSP server 103 to transfer the target data (3) This request includes the specification of a backup disk partition from which data is to be transferred. The data transfer unit 121 passes the data to the data transfer unit 116 in the MSP server 101 (4). The transferred data is allowed to enter the data restore unit 118 where restore processing is done (5). If the restore processing succeeds, the data is transferred from the data restore unit 118 via the data transfer unit 116 (6) to the data transfer unit 112 in the USR server 102 (7).

Note that if records cannot be obtained from a SSP server 103 due to failure or the like, the data restore unit 118 regenerates the lost records by using ECC or parity information.

Figure 10:
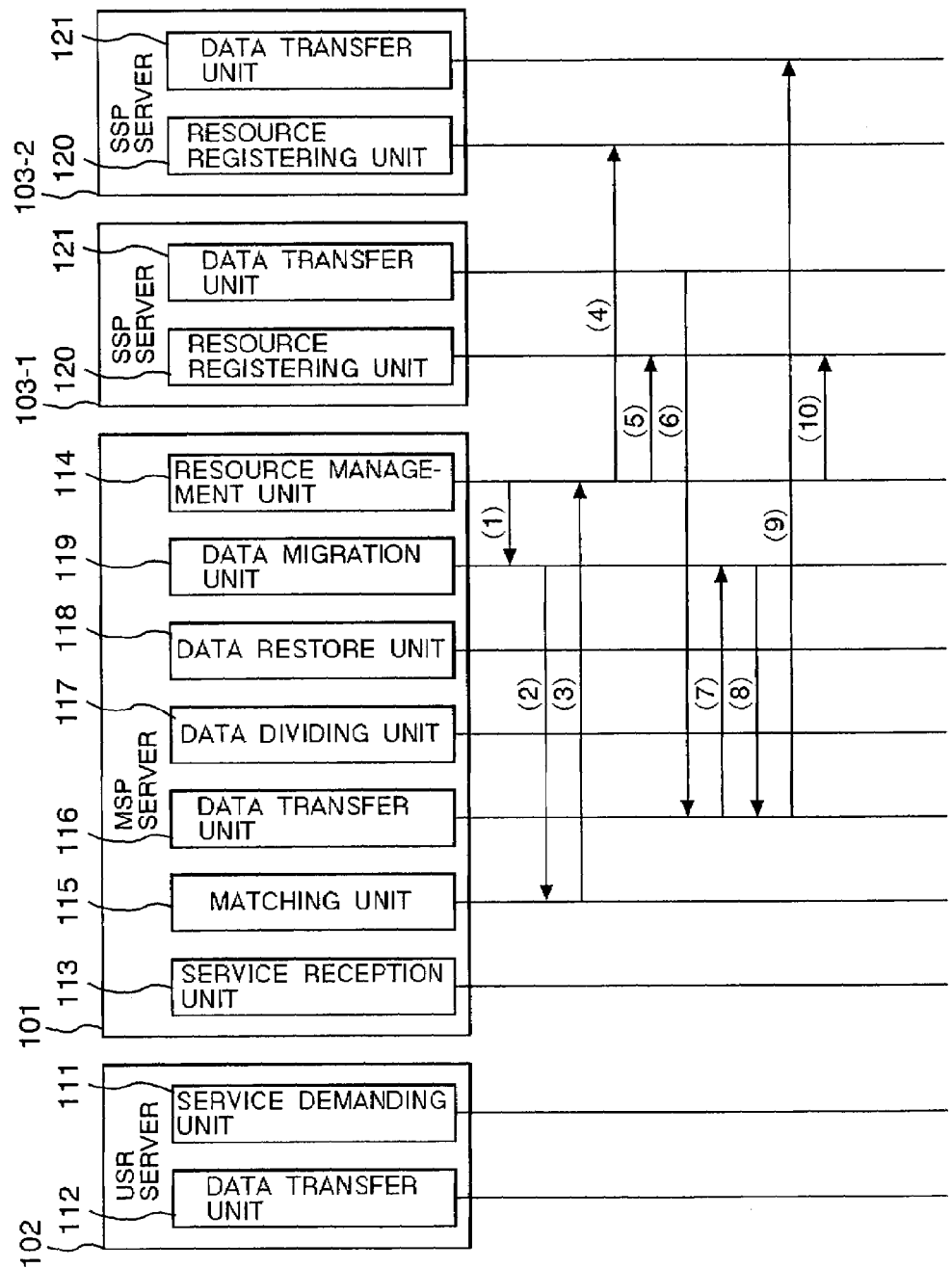
FIG. 10 is a time chart showing a processing procedure for data migration in the preferred embodiment.

FIG. 10 is a time chart indicating how processing is done for data migration. If the available term of a resource expires, the MSP server 101 must perform data migration. The resource management unit 114 checks the term 604 fields of the SSP conditions TBL 124, and if the available term of any SSP disk expires, it issues a data migration request to the data migration unit 119 (1). The data migration unit 119 issues a matching processing request for the user data to be moved to the matching unit 115 (2). The user data to be moved is identified by referring to the disk dividing TBL 125 and data allocation TBL 123.

The matching unit 115 searches the user conditions and SSP conditions for mutually conforming combinations. Note that the data to be moved is limited to the data stored in resources whose availability term has expired. Therefore, the minimum backup capacity and the number of distributions are set for the data to be moved without using the initially set minimum backup space and number of distributions. At step 302, the number of SSP disks whose availability term has expired is used instead of (the number of distributions—1). Cost comparison at Step 313 is omitted, too. After the search, the matching unit 115 notifies the resource management unit 114 of the matching result (3), and the resource management unit 114 issues a rental notice to the resource registering unit 120 of, for example, the SSP server 103-2 (4). The rental notice includes the specification of a new disk partition for backup. The resource management unit 114 requests the resource registering unit 120 of the SSP server 103-1 (whose availability term has expired) to collect the data (5). The collection request includes the specification of the disk partition to which the data is to be moved. The data transfer unit 121 transfers the data to the data transfer unit 116 of the MSP server 101 (6).

The data migration unit 119 is notified that the data is transferred to the MSP server 101 (7). The data migration unit 119 notifies the data transfer unit 116 of the address of the data destination (the address of the SSP server 103-2, disk identifier, partition identifier, logical block number of the partition in the disk, etc.) (8). Then, the data transfer unit 116 transfers the received data to the data transfer unit 121 of the data destination SSP server 103-2 (9). When migration of the user data which must be moved to new backup disks is complete, the data migration unit 119 updates the disk dividing TBL 125 and data allocation TBL 123 so as to indicate the new backup disks. In addition, the resource management unit 114 of the MSP server 101 issues a rental ending request to the resource management unit 120 of the SSP server 103-1 used formerly for backup (10). This request includes the specification of the disk partition whose rental is to be terminated.

Figure 11:
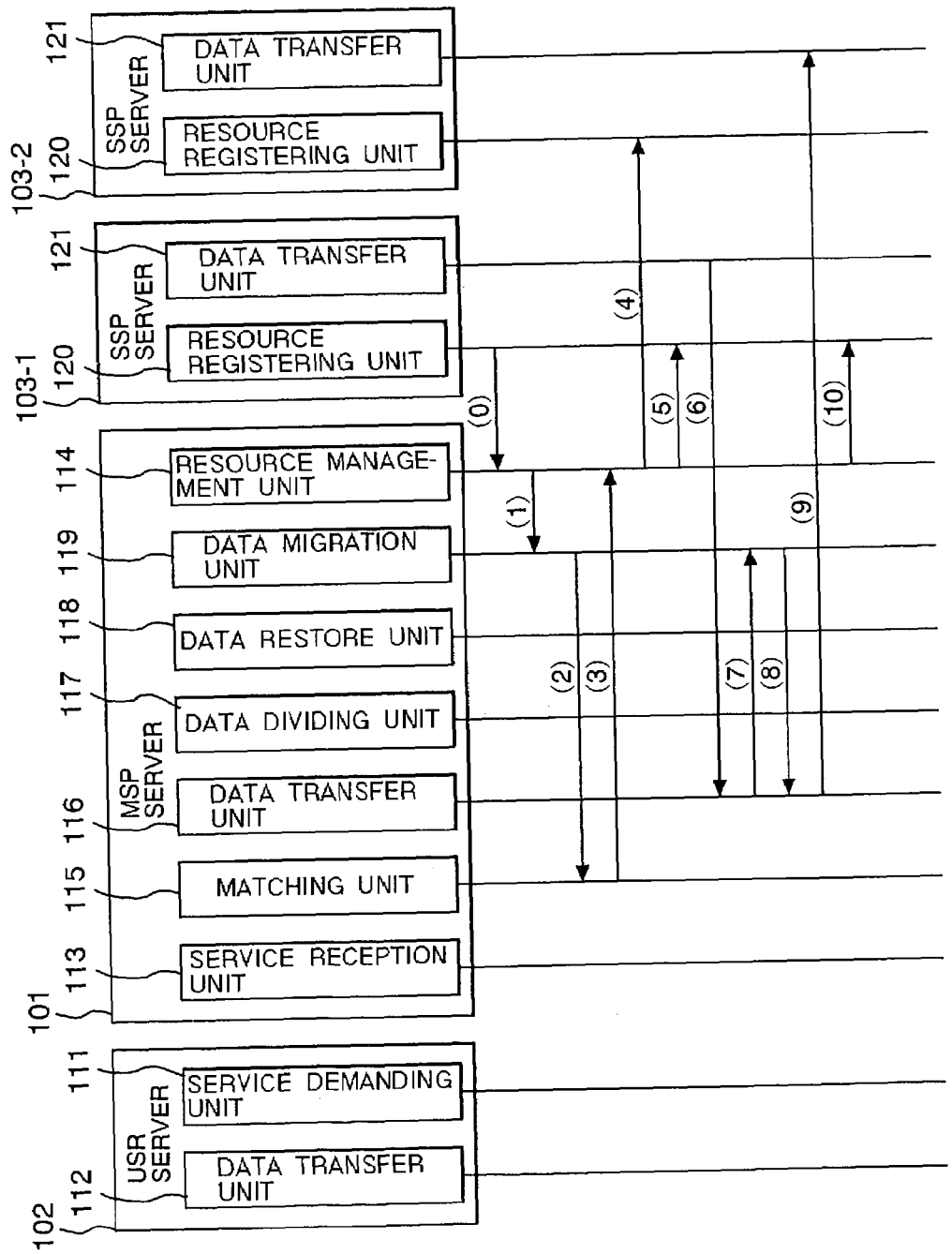
FIG. 11 is a time chart showing a processing procedure for disk return in the preferred embodiment.

FIG. 11 is a time chart indicating how exchanges are done when a disk is returned. If a SSP server 103 requests the MSP server 101 to return a lent storage device within its availability term, the MSP server 101 must execute data migration, too. Upon receiving a storage return request from the resource registering unit 120 of, for example, the SSP server 103-1 (0), the resource management unit 114 starts the data migration procedure based on this request. This request includes the identifier of a disk which is to be returned. The subsequent procedure is same as described with reference to FIG. 10.

For user data under generation management, it is usual that a plurality of backup copies are held for the corresponding generations. Term 504 fields can be set so as to always retain a predetermined number of such backup copies. In this case, the MSP server 101 monitors the term 504 fields of the user conditions TBL 122, and if the term of a disk completes or expires, issues a rental ending request to the SSP server 103 having the disk in order to release its partitions.

According to the present invention, it is possible to provide users with a data backup storage device which shows high safety against disasters, etc. and is advantageous in terms of cost.

What is claimed is:

1. A user data backup method by a computer which resides between a user side computer environment and a storage service side computer environment to support storage service, the data backup method comprising:

selecting plural storage devices, which satisfy conditions indicated by the user side computer environment, from a plurality of entirely or partially empty storage devices owned by the storage service side computer environment;

receiving user data from the user side computer environment;

dividing the user data into records of a predetermined size;

transmitting the records to the storage service side computer environment so that the records are to be distributed and stored to the selected plural storage devices; and holding storage service side conditions for providing said storage devices owned by said storage service side computer environment; wherein:

said storage service side conditions include end data until which the respective storage devices are available, said end dates being registered to memory means, said computer checks if said end dates have passed;

if any of said end dates is found to have passed, at least one storage device which satisfies the conditions indicated by the user side computer environment is selected as an alternative, said computer receives at least part of said user data stored in the storage device whose end date has passed, and said computer transmits the received user data to the selected at least one alternative storage device.

2. A data backup computer program, for a computer which resides between a user side computer environment and a storage service side computer environment to support storage service, the data backup computer program allowing the computer to implement functions comprising:

selecting plural storage devices which satisfy conditions indicated by the user side computer environment, from a plurality of entirely or partially empty storage devices owned by the storage service side computer environment;

receiving user data from the user side computer environment;

dividing the user data into records of a predetermined size; and transmitting the records to the storage service side computer environment so that the records are to be distributed and stored to the selected plural storage devices, wherein:

said computer holds storage service side conditions for providing said storage devices owned by said storage service side computer environment, and said storage service side conditions include end dates until which the respective storage devices are available, said end dates being registered to memory means; and wherein the data backup computer program allows said computer to further implement functions comprising:

checking if the end dates have passed, if any of said end dates is found to have passed, selecting at least one storage device which satisfies the conditions indicated by the user side computer environment as an alternative, receiving at least part of said user data stored in the storage device whose end date has passed, and transmitting the received user data to the selected at least one alternative storage device.

3. A user data backup system comprising a management service computer a user side computer and a storage service side computer for holding data management service computer comprising:

a matching unit for selecting plural storage devices which satisfy both conditions indicated by a user and storage side conditions for providing the storage devices owned by the storage service side computer, the storage side conditions including end dates until which the respective storage devices are available, the end dates being registered to a memory of the management service computer;

a data dividing unit for dividing user data received from the user side computer into records of a predetermined size; and a data transfer unit for receiving user data from the user side computer and transmitting the records to the storage service side computer so that the records are to be distributed and stored to the selected plural storage devices, wherein:

the matching unit re-selects at least one storage device which satisfies the conditions indicated by the user, if any of the end dates is found to have passed, the data transfer unit receives at least part of the user data stored in a storage device whose end date has passed, and the data transfer unit transmits the user data received from the storage device whose end date has passed to the re-selected at least one storage device.

4. A method for storing data by a first computer to storage devices, the method comprising:

storing one or more first conditions of the storage devices, the first conditions including an end date until which the respective storage devices are available, the end date being stored into a memory of the first computer;

selecting one or more storage devices based on one or more second conditions sent from a second computer;

transmitting data received from the second computer to the selected one or more storage devices;

re-selecting one or more storage devices which satisfy the second conditions, if a current date exceeds the end date;

receiving at least part of data stored in a storage device whose end date has been exceeded; and transmitting data received from the storage device whose date has been exceeded to the re-selected one or more storage devices.

5. The method according to claim 4, further comprising:

dividing the data received from the second computer in a predetermined size;

wherein the transmitting to selected storage devices comprises distributing the divided data to the selected storage devices.

6. The method according to claim 5, further comprising:

storing code information, which is used for restoring the divided data, in one of the selected storage devices.

7. A system comprising a first computer for receiving and storing data from a second computer and for transmitting the data received from the second computer to storage devices for holding the data received from the second computer, the first computer comprising:

a resource management unit for storing one or more first conditions of the storage devices in memory of the first computer, the first conditions including an end date until which the respective storage devices are available;

a matching unit for selecting one or more storage devices based on one or more second conditions sent from the second computer; and a data transfer unit for transmitting data received from the second computer to the one or more selected storage devices, wherein:

the matching unit re-selects one or more storage devices which satisfy the second conditions, if a current date exceeds the end date, the data transfer unit receives at least part of data stored in a storage device whose end date has been exceeded, and the data transfer unit transmits data received from the storage device whose end date has been exceeded to the one or more re-selected storage devices.

8. The system according to claim 7, wherein:

the first computer further comprises a data dividing unit for dividing the data received from the second computer in a predetermined size, and the data transfer unit distributes the divided data to selected storage devices.

9. The system according to claim 8, wherein the first computer further stores code information, which is used for restoring the divided data, in one of the selected storage devices.

* * * * *